United States Patent Office 2,832,804
Patented Apr. 29, 1958

2,832,804

PRODUCTION OF 1-AMINOINDAN DERIVATIVES

Helmer Richter, Berlin-Grunewald, and Martin Schenck, Berlin-Frohnau, Germany, assignors to Firma Schering A. G., Berlin, Germany No Drawing. Application April 3, 1957
Serial No. 650,313

Claims priority, application Germany April 13, 1956

20 Claims. (Cl. 260—575)

The present invention relates to new 1-aminoindan derivatives, and more particularly to 1-aminoindan derivatives which have surprisingly high activity as blood vessel dilators.

1-aminoindan and compounds derived therefrom are known in relatively large number. These compounds show various valuable physiological properties in many directions. However, no coronary blood vessel dilating action has been observed for the known compounds.

It is accordingly a primary object of the present invention to provide new 1-aminoindan compounds, which compounds have a high activity as coronary blood vessel dilators.

It is another object of the present invention to provide a method of producing such 1-aminoindan derivatives.

Other objects and advantages of the present invention will be apparent from a further reading of the specification and of the appended claims.

With the above objects in view, the present invention mainly consists in new 1-aminoindan derivatives which are unsubstituted in the 5-member ring and which have an alkoxy group in the 5-position of the benzene ring, the alkoxy group containing more than 3 carbon atoms. Preferably the alkoxy group should contain between 4 and 8 carbon atoms, and most preferably between 4 and 6 carbon atoms. Thus, the new compounds of the present invention have the following structural formula:

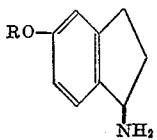

in which R is an alkyl group of more than 3 carbon atoms and preferably of 4–8 carbon atoms.

The new alkoxy-1-aminoindan compounds of the present invention can be produced by hydrogenating the oxime or the oxime ether of the corresponding alkoxy-1-indanone in an organic solvent, preferably an alcohol, in the presence of a hydrogenation catalyst such as Raney nickel or a noble metal catalyst such as palladium black, with the addition of a mineral acid, preferably at moderately increased temperatures and normal pressure.

It has been found that the hydrogenation of the oxime ethers in accordance with the present invention does not yield the 1-hydroxyl amino compound as would be expected, but rather the 1-amino compounds of the present invention. Therefore, it is possible in accordance with the present invention to utilize the oxime ether instead of the free oxime as the starting substance. This can be of advantage since it has been shown that the usual production of the oxime from the corresponding alkoxy-1-indanones in many cases results in difficulties while it runs smoothly when oxy-1-indanones are utilized as the starting material. On the other hand, there are no difficulties involved in the subsequent alkylation of the hydroxyl group of oximes of oxy-1-indanone according to the known methods, whereby, of course, the oxime hydroxyl group is alkylated at the same time.

A preferable method for the production of the starting material which is utilized in the method of the present invention is illustrated by the following equations, the scope of the invention, however, not being limited thereto. In the equation R stands for an alkyl radical of more than 3 carbon atoms.

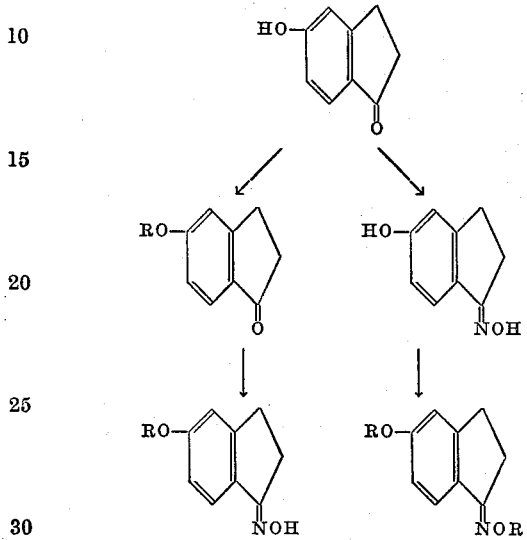

The method of the present invention can then proceed according to the folowing equation:

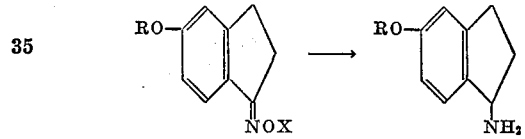

in which X stands for a hydrogen atom or the alkyl group R.

It should be noted that the alkoxy-1-aminoindan compounds in which the alkoxy group contains less than 4 carbon atoms have substantially no action on the coronary vessels. It is only the higher alkoxy derivatives of the present invention which have a substantial coronary blood vessel dilating action. This is illustrated by the following table.

The trade preparation "Khellin" which is 5,8-dimethoxy-2-methyl-(furano-2',3':7,6-chromone) was utilized as the comparison substance.

Besides a superior activity with simultaneously lowered toxicity, the compounds of the present invention possess the advantage over the known product "Khellin" of being water-soluble in the form of their acid addition salts.

| Tested Compound | Toxicity, LD–50, intravenous, in mg. per kg. of rat | Coronary vessel dilating action in percent on the Langendorff heart after the administration of— | | |
|---|---|---|---|---|
| | | 10γ | 20γ | 50γ |
| 5-methoxy- | 152 | no action | no action | 23. |
| 5-ethoxy- | 107 | ---do------- | ---do------- | 15. |
| 5-isoproxy- | 137 | | | 30. |
| 5-butyloxy- | 137 | | 25------- | 65. |
| 5-hexyloxy-1-aminoindan-hydrochloride. | 53 | 125------- | 200------- | 230. |
| 5-methoxy-2-aminoindan-hydrochloride. | 86.7 | no action | no action | no action. |
| "Khellin" | 34.4 | ---do------- | 18------- | 32. |

The 5-heptyloxy-1-aminoidan and 5-oxtyloxy-1-aminoindan compounds also have superior therapeutic activity.

As opposed to the above, the known preparation oxyethyl-theophylline by the same testing method gives a value of 4% only after the administration of 200γ of the substance. The LD-50 of this substance is 486.

The following examples are given to illustrate the method of the present invention and the production of compounds of the present invention, the scope of the invention not, however, being limited to the specific details of the examples.

*Example 1*

6.5 g. of 5-oxyindanone-(1) (melting point=182° C.), obtained from m-oxyhydrocinnamic acid (melting point= 108–110° C.) which lends itself to cyclization, for example by means of hydrofluoric acid (Organic Reactions, vol. II, 1944, page 125, J. Wiley & Sons), are dissolved in 25 cc. of pyridine and mixed with a solution of 3.3 g. of hydroxylamine-hydrochloride in 10 cc. of 80% ethyl alcohol. After standing for 48 hours at room temperature, the reaction mixture is poured into water. The separated 5-oxyindanone-oxime-(1) is sucked-off by filtration and dried. The melting point is 208°–210° C. with decomposition and the yield is 5 g. The product can, without further purification, be subjected to esterification.

4.1 g. of 5-oxyindanone-oxime-(1) is mixed with 50 cc. of isopropyl alcohol, 3.4 g. of powdered potassium hydroxide and 7.1 g. of isopropyl bromide, and the mixture is heated to refluxing for 8 hours. The mixture is poured into water and the diether is taken up with chloroform. The chloroform extract is washed with water and then concentrated under vacuum. There is thereby immediately obtained a pure N-isopropoxy ether of 5-isopropoxy-indanone-oxime-(1) which melts at 224° C. with decomposition. Non-converted 5-oxyindanone-oxime-(1) can be re-obtained from the aqueous phase by acidification.

1.8 g. of the diether is dissolved in 20 cc. of methanol and the solution is mixed with 0.2–0.3 cc. of concentrated hydrochloric acid. With the introduction of palladium black as catalyst the mixture is hydrogenated under normal pressure at 40° C. After about 15 hours, the amount of hydrogen taken up corresponds to 100% of the theoretical. The catalyst is then separated and the filtrate concentrated under vacuum under the protection of a nitrogen atmosphere. There is thus obtained 1.3 g. of crude 5-isopropoxy-1-aminoindan-hydrochloride. The substance can be re-crystallized from methanol-ether. 1.1 g. of the hydrochloride having a melting point of 172°–173° C. is obtained.

*Example 2*

5.5 g. of 5-butoxy-indanone-(1) (a wax-like substance) obtained from m-butoxy-hydrocinnamic acid (melting point=80°–84° C.), which is for example cyclized by means of polyphosphoric acid, are dissolved in 15 cc. of pyridine and mixed with a solution of 2.2 g. of hydroxylamine hydrochloride in 7 cc. of 80% alcohol. The reaction mixture is allowed to stand for 48 hours at room temperature and is then poured into water. The separated 5-butoxy-indanone-oxime-(1) is sucked off under vacuum and dried. The melting point is 155°–157° C. The yield is 6 g. The product can without further purification be subjected to hydrogenation.

6.9 g. of 5-butoxy-indanone-oxime are dissolved in 70 cc. of methanol and mixed with 1 cc. of concentrated hydrochloric acid. The product is subjected to hydrogenation utilizing palladium black as catalyst under normal pressure and at a temperature of 40° C. After 25 hours the amount of hydrogen taken up corresponds to 95% of the theoretical. The catalyst is separated and the solution is concentrated under vacuum under the protection of a nitrogen atmosphere. The residue is re-precipitated from methanol-ether. There is thus obtained 4 g. of 5-butoxy-1-aminoindane-hydrochloride having a melting point of 152°–155° C.

*Example 3*

23.2 g. of 5-hexyloxyindanone-(1) having a melting point of about 80° C. (wax-like bodies) obtained from m-hexyloxyhydrocinnamic acid (melting point=53°–55° C.) which can be cyclized for example by means of polyphosphoric acid, are dissolved in 70 cc. of pyridine and mixed with a solution of 8.4 g. of hydroxylamine hydrochloride in 25 cc. of 80% ethyl alcohol. After standing for 48 hours at room temperature the reaction mixture is poured into water. The separated 5-hexyloxyindanone-oxime-(1) is sucked off under vacuum and dried. The melting point is 98°–100° C. and the yield is 20.6 g. The product can, without further purification, be subjected to hydrogenation.

2.5 g. of 5-hexyloxyindanone-oxime-(1) are dissolved in 30 cc. of methanol, mixed with 0.3–0.4 cc. of concentrated hydrochloric acid and hydrogenated under normal conditions utilizing palladium black as catalyst. After 25 hours the amount of hydrogen taken up corresponds to 97.2% of the theoretical. The catalyst is separated and the solution concentrated under vacuum to dryness. The thus obtained crude 5-hexyloxy-1-aminoindan hydrochloride melts at 156°–159° C. The yield amounts to 2.3 g. The hydrochloride can be re-crystallized from water. There is thus obtained 2 g. of a product which melts at 164°–165° C., this product being 5-hexyloxy-1-aminoindan.

The hydrogenation can also be carried out utilizing Raney nickel as catalyst, as follows:

12.3 g. of 5-hexyloxy-indanone-oxime-(1) is dissolved in 80 cc. of methanol and the solution is poured into a hydrogen bomb. It is of advantage to add some liquid ammonia. The hydrogenation is then carried out utilizing Raney nickel as catalyst at a temperature of 70° C. and under 130 atmospheres of pressure. After 90 minutes the take-up of hydrogen is completed. The catalyst is separated, the solution evaporated to dryness under vacuum and the residue taken up in ether. The hydrochloride is precipitated by ethereal hydrochloric acid and the hydrochloride is reprecipitated from emthanol-ether. The yield amounts to 11.2 g. of 5-hexyloxy-1-aminoindan hydrochloride which melts at 160°–164° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, a 1-aminoindan compound having the following structural formula:

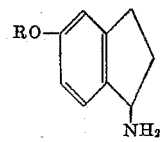

in which R is a alkyl group of more than 3 carbon atoms.

2. As a new composition of matter, a 1-aminoindan compound having the following structural formula:

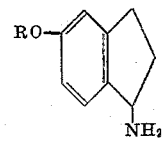

in which R is an alkyl group of 4–8 carbon atoms.

3. As a new composition of matter, a 1-aminoindan compound having the following structural formula:

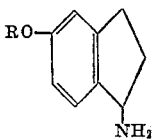

in which R is an alkyl group of 4–6 carbon atoms.

4. As a new composition of matter, non-toxic acid addition salts of the compound of claim 1.

5. As a new composition of matter, the hydrochloride of the compound of claim 1.

6. As a new composition of matter, 5-butoxy-1-aminoindan.

7. As a new composition of matter, 5-butoxy-1-aminoindan hydrochloride.

8. As a new composition of matter, 5-hexyloxy-1-aminoindan.

9. As a new composition of matter, 5-hexyloxy-1-aminoindan hydrochloride.

10. A method of producing a 5-alkoxy-1-aminoindan, comprising the steps of subjecting a substance selected from the group consisting of the oxime and the oxime ether of a 5-alkoxy-1-indanone dissolved in an organic solvent therefor to hydrogenation in the presence of a hydrogenation catalyst so as to form a corresponding 5-alkoxy-1-amino-indan; and recovering the thus formed 5-alkoxy-1-amino-indan.

11. A method of producing a 5-alkoxy-1-aminoindan, comprising the steps of subjecting a substance selected from the group consisting of the oxime and the oxime ether of a 5-alkoxy-1-indanone, the alkoxy group of which contains more than 3 carbon atoms, dissolved in an organic solvent therefor to hydrogenation in the presence of a hydrogenation catalyst so as to form the corresponding 5-alkoxy-1-aminoindan; and recovering the thus formed 5-alkoxy-1-aminoindan.

12. A method of producing a 5-alkoxy-1-aminoindan, comprising the steps of subjecting a substance selected from the group consisting of the oxime and the oxime ether of a 5-alkoxy-1-indanone, the alkoxy group of which contains between 4–8 carbon atoms, dissolved in an organic solvent therefor to hydrogenation in the presence of a hydrogenation catalyst so as to form the corresponding 5-alkoxy-1-aminoindan; and recovering the thus formed 5-alkoxy-1-aminoindan.

13. A method of producing a 5-alkoxy-1-aminoindan, comprising the steps of subjecting a substance selected from the group consisting of the oxime and the oxime ether of a 5-alkoxy-1-indanone dissolved in an alcohol to hydrogenation in the presence of a hydrogenation catalyst so as to form the corresponding 5-alkoxy-1-aminoindan; and recovering the thus formed 5-alkoxy-1-aminoindan.

14. A method of producing a 5-alkoxy-1-aminoindan, comprising the steps of subjecting a substance selected from the group consisting of the oxime and the oxime ether of a 5-alkoxy-1-indanone dissolved in methyl alcohol to hydrogenation in the presence of a hydrogenation catalyst so as to form the corresponding 5-alkoxy-1-aminoindan; and recovering the thus formed 5-alkoxy-1-aminoindan.

15. A method of producing a 5-alkoxy-1-aminoindan, comprising the steps of subjecting a substance selected from the group consisting of the oxime and the oxime ether of a 5-alkoxy-1-indanone dissolved in an organic solvent therefor to hydrogenation in the presence of a hydrogenation catalyst selected from the group consisting of Raney nickel and noble metals and in the presence of a mineral acid so as to form the corresponding 5-alkoxy-1-aminoindan; and recovering the thus formed 5-alkoxy-1-aminoindan.

16. A method of producing a 5-alkoxy-1-aminoindan, comprising the steps of subjecting a substance selected from the group consisting of the oxime and the oxime ether of a 5-alkoxy-1-indanone dissolved in methyl alcohol to hydrogenation in the presence of palladium black as hydrogenation catalyst so as to form the corresponding 5-alkoxy-1-aminoindan; and recovering the thus formed 5-alkoxy-1-aminoindan.

17. A method of producing a 5-alkoxy-1-aminoindan, comprising the steps of subjecting a substance selected from the group consisting of the oxime and the oxime ether of a 5-alkoxy-1-indanone dissolved in an organic solvent therefor to hydrogenation in the presence of a hydrogenation catalyst at substantially normal pressure and slightly increased temperature and in the further presence of a mineral acid so as to form the corresponding 5-alkoxy-1-aminoindan; and recovering the thus formed 5-alkoxy-1-aminoindan.

18. A method of producing a 5-alkoxy-1-aminoindan, comprising the steps of subjecting a substance selected from the group consisting of the oxime and the oxime ether of a 5-alkoxy-1-indanone dissolved in methyl alcohol to hydrogenation in the presence of palladium black as hydrogenation catalyst at substantially normal pressure and at a slightly increased temperature of up to about 40° C. and in the further presence of hydrochloric acid so as to form the corresponding 5-alkoxy-1-aminoindan; and recovering the thus formed 5-alkoxy-1-aminoindan.

19. A method of producing a 5-alkoxy-1-aminoindan, comprising the steps of subjecting a substance selected from the group consisting of the oxime and the oxime ether of a 5-alkoxy-1-indanone, the alkoxy group of which contains more than 3 carbon atoms, dissolved in methyl alcohol to hydrogenation in the presence of palladium black as hydrogenation catalyst at substantially normal pressure and at a slightly increased temperature of up to about 40° C. and in the further presence of hydrochloric acid so as to form the corresponding 5-alkoxy-1-aminoindan; and recovering the thus formed 5-alkoxy-1-aminoindan.

20. A method of producing a 5-alkoxy-1-aminoindan, comprising the steps of subjecting a substance selected from the group consisting of the oxime and the oxime ether of a 5-alkoxy-1-indanone, the alkoxy group of which contains 4–8 carbon atoms, dissolved in methyl alcohol to hydrogenation in the presence of palladium black as hydrogenation catalyst at substantially normal pressure and at a slightly increased temperature of up to about 40° C. and in the further presence of hydrochloric acid so as to form the corresponding 5-alkoxy-1-aminoindan; and recovering the thus formed 5-alkoxy-1-aminoindan.

No references cited.